F. H. BRINKKOTTER
Wheels for Vehicles.
No. 146,162.    Patented Jan. 6, 1874.
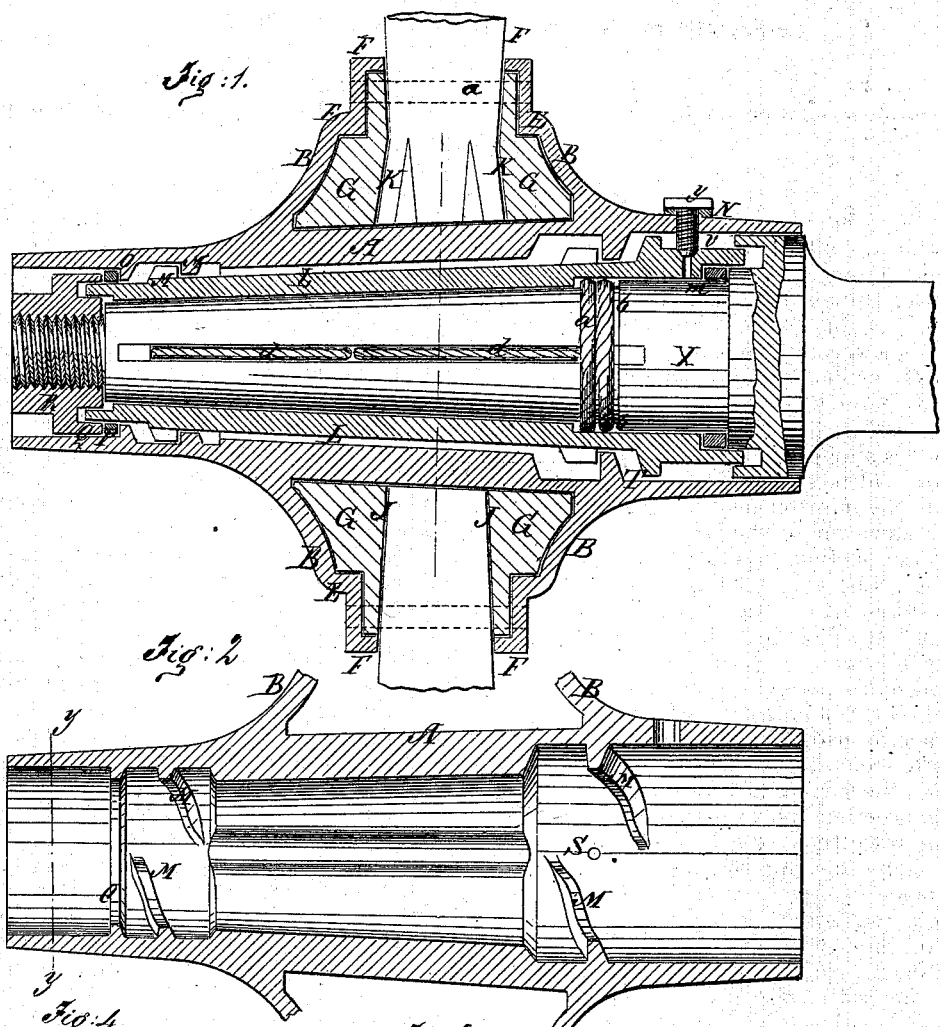

UNITED STATES PATENT OFFICE.

FREDERICK H. BRINKKOTTER, OF QUINCY, ILLINOIS.

IMPROVEMENT IN WHEELS FOR VEHICLES.

Specification forming part of Letters Patent No. 146,162, dated January 6, 1874; application filed March 22, 1873.

*To all whom it may concern:*

Be it known that I, FREDERICK H. BRINKKOTTER, of Quincy, in the county of Adams and State of Illinois, have invented a new and Improved Wagon-Wheel Hub, of which the following is a specification:

The invention consists in the improvement of hubs, as hereinafter described, and pointed out in the claims.

Figure 1 is a longitudinal sectional elevation of the hub and box of a wheel constructed according to my improvements. Fig. 2 is a longitudinal elevation of the box only. Fig. 3 is a transverse section taken on the line $x\ x$ of Fig. 1; and Fig. 4 is a transverse section of the box, taken on the line $y\ y$ of Fig. 2.

Similar letters of reference indicate corresponding parts.

A represents the cylindrical portion of the hub, and B the flanges, which are formed on the surface to provide a deep annular groove, in which to secure the spokes C. These flanges rise out of the surface of the cylinder at a considerably greater distance from each other than the breadth of the spokes, and incline toward each other for the greater portion of the distance to the periphery in about the same form that other hubs are constructed in respect of their exterior form; but at E they make a short turn directly toward the spokes, and for the rest of the distance they are parallel to each other, and have a flange, F, on the inside, and form a dovetail-shaped annular chamber, in which I fit collars or wings of wood, G, divided in two parts, as shown at H, Fig. 3, for putting them in. They are coated with white lead, or soaked in oil, or otherwise treated, to prevent them from shrinking, and the spokes are driven in so as to wedge tightly all the way to the bottom, as at J, Fig. 1, or part way, and wedged out at the ends, as at K, the rings being undercut from the inner edges about half-way to the periphery. The inside of the hub, also the exterior of the box L, I provide with short spiral ribs, M, near each end, to lock the box against end motion by turning it after it is inserted in the hub, so that the ribs bear against each other; and near the outer end of the box I provide an annular ring, O, against which I fit a leather washer, P, to pack the joint tight by a flange, Q, of the nut R; then lay the wheel down with the inside of the hub up, center the box at that end, and fill the space with melted sulphur as high as the holes S, or to the collar T, to secure the box in the hub, and at the collar I pack in lead or other material to prevent the contact of the oil and sulphur. U is an oil-chamber, which is packed with a leather washer, V, to prevent the oil from running into the box too freely over the end. W is a hole through the box to admit the oil to the axle X, under the control of the regulating-screw Y, which is screwed down against a leather washer, Z, under the head to bind it fast, and to regulate the flow of oil, by using thicker or thinner ones, according to the space required at the point of the screw. $a$ represents one or more coils of absorbent material wound around the axle below the shoulder $b$ of the upper bearing, to limit the flow of oil toward the outer end; and $d$ represents similar material arranged in a groove running lengthwise of the axle and fastened in radial holes at the ends of the groove by pins or keys; also fastened at the middle by passing under the surface between two radial holes. The flanges will be secured against the sides of the spokes snugly by rivets $a'$ passing between the spokes, which will be suitably grooved therefor.

I am aware that wedges have been used to expand and hold wood in sockets, and that side supports have been before employed in connection with spokes.

Having thus described my invention, I claim as new and desire to secure by Letters Patent—

1. The undercut rings G G and wedges K, combined with the spokes and hub-shell, in the manner set forth.
2. The nut R, having annular recess to receive edge of box L, and flange Q, that presses against a packing, P, and ring O, all combined as and for the purpose specified.

FREDERICK H. BRINKKOTTER.

Witnesses:
 JOHN D. MERSEN,
 JAMES H. BARTLETT.